US011942301B2

(12) United States Patent
Lewis

(10) Patent No.: US 11,942,301 B2
(45) Date of Patent: Mar. 26, 2024

(54) REMOVABLE LAWN MOWER PTO SWITCH COVER

(71) Applicant: JENDYK MANUFACTURING, INC., Swainsboro, GA (US)

(72) Inventor: Bryant F. Lewis, Swainsboro, GA (US)

(73) Assignee: JENDYK MANUFACTURING, INC., Swainsboro, GA (US)

( * ) Notice: Subject to any disclaimer, the term of this patent is extended or adjusted under 35 U.S.C. 154(b) by 436 days.

(21) Appl. No.: 17/173,397

(22) Filed: Feb. 11, 2021

(65) Prior Publication Data

US 2021/0262256 A1 Aug. 26, 2021

Related U.S. Application Data

(60) Provisional application No. 62/979,529, filed on Feb. 21, 2020.

(51) Int. Cl.
| | |
|---|---|
| *H01H 9/28* | (2006.01) |
| *A01D 34/68* | (2006.01) |
| *A01D 34/81* | (2006.01) |
| *A01D 34/82* | (2006.01) |
| *A01D 101/00* | (2006.01) |

(52) U.S. Cl.
CPC ........... *H01H 9/287* (2013.01); *A01D 34/828* (2013.01); *A01D 34/6818* (2013.01); *A01D 34/81* (2013.01); *A01D 2101/00* (2013.01)

(58) Field of Classification Search
CPC .. A01D 34/828; A01D 34/81; A01D 34/6818; H01H 9/287; E05B 13/001
USPC ........................................... 200/43.22, 43.16
See application file for complete search history.

(56) References Cited

U.S. PATENT DOCUMENTS

| | | | | |
|---|---|---|---|---|
| 105,105 | A * | 7/1870 | Angeloni | F16B 41/005 70/18 |
| 719,684 | A * | 2/1903 | Moore | E05B 9/084 70/370 |
| 795,952 | A * | 8/1905 | McIlhenny | F16B 41/005 70/18 |
| 1,772,747 | A * | 8/1930 | Croning | B60R 25/04 70/252 |
| 1,829,444 | A * | 10/1931 | Goebel | E05B 37/00 70/284 |
| 2,662,389 | A * | 12/1953 | McKitrick | H01H 9/283 200/43.13 |
| 3,229,452 | A * | 1/1966 | Hasenbank | A01D 34/6806 56/14.7 |
| 3,245,240 | A * | 4/1966 | De Forrest | E05B 13/001 70/2 |
| 3,269,159 | A * | 8/1966 | Young | B62D 53/085 280/433 |

(Continued)

*Primary Examiner* — Thomas B Will
*Assistant Examiner* — Julia C Tran
(74) *Attorney, Agent, or Firm* — Dority & Manning, P.A.

(57) ABSTRACT

Apparatus and methodology for lawn mower security systems provide the ability to safeguard ride-on style lawn mowers against unauthorized cranking of its engine if the mowers have push/pull mower deck or power-takeoff (PTO) switch technology. Security components secured to a PTO or mower deck switch to prevent the ability to position such switch in a disengaged position. Therefore, existing safety and interlock features of the existing ride-on mower otherwise prevent someone from being able to crank the mower, which helps to guard against unauthorized use and/or theft of the equipment.

9 Claims, 16 Drawing Sheets

(56) References Cited

U.S. PATENT DOCUMENTS

| | | | | |
|---|---|---|---|---|
| 3,736,729 A * | 6/1973 | Peterson | A01D 34/64 | 56/10.5 |
| 3,746,818 A * | 7/1973 | Bertelloti | H01H 9/287 | 200/43.18 |
| 3,811,303 A * | 5/1974 | Robertson | B60R 25/023 | 200/61.54 |
| 3,869,014 A * | 3/1975 | Federspiel | B60T 11/103 | 188/2 R |
| 4,044,532 A * | 8/1977 | Lessig, III | H01H 3/20 | 56/10.5 |
| 4,074,550 A * | 2/1978 | Rowlings | B60R 25/023 | 200/61.54 |
| 4,254,888 A * | 3/1981 | Chandler | F17C 13/06 | 70/164 |
| 4,300,373 A * | 11/1981 | Camos | F16B 41/007 | 70/164 |
| 4,541,256 A * | 9/1985 | Green | F16L 35/00 | 16/386 |
| 4,631,938 A * | 12/1986 | Johnson | E05B 13/001 | 70/427 |
| 4,798,069 A * | 1/1989 | DeForrest, Sr. | E05B 17/142 | 70/211 |
| 5,033,280 A * | 7/1991 | Johnson | F16L 35/00 | 70/455 |
| 5,092,359 A * | 3/1992 | Wirth | E21B 34/02 | 137/382 |
| 5,468,925 A * | 11/1995 | Mohsen | H01H 9/283 | 200/43.11 |
| 6,109,010 A * | 8/2000 | Heal | B60K 28/10 | 56/10.8 |
| 6,123,098 A * | 9/2000 | Gremillion, III | F16K 35/10 | 220/4.24 |
| 7,128,177 B2 * | 10/2006 | Harvey | B60K 28/10 | 180/53.6 |
| 11,137,108 B1 * | 10/2021 | Marton | E05B 19/0005 | |
| 2009/0065273 A1 * | 3/2009 | Wyatt | B60W 30/1886 | 180/65.8 |
| 2012/0047973 A1 * | 3/2012 | Su | G05G 5/02 | 70/174 |
| 2012/0317949 A1 * | 12/2012 | Abe | H01H 3/20 | 56/11.9 |
| 2014/0332357 A1 * | 11/2014 | Kirbawy | H01H 13/063 | 200/16 B |
| 2015/0257336 A1 * | 9/2015 | Dwyer | H01H 3/46 | 56/14.7 |

* cited by examiner

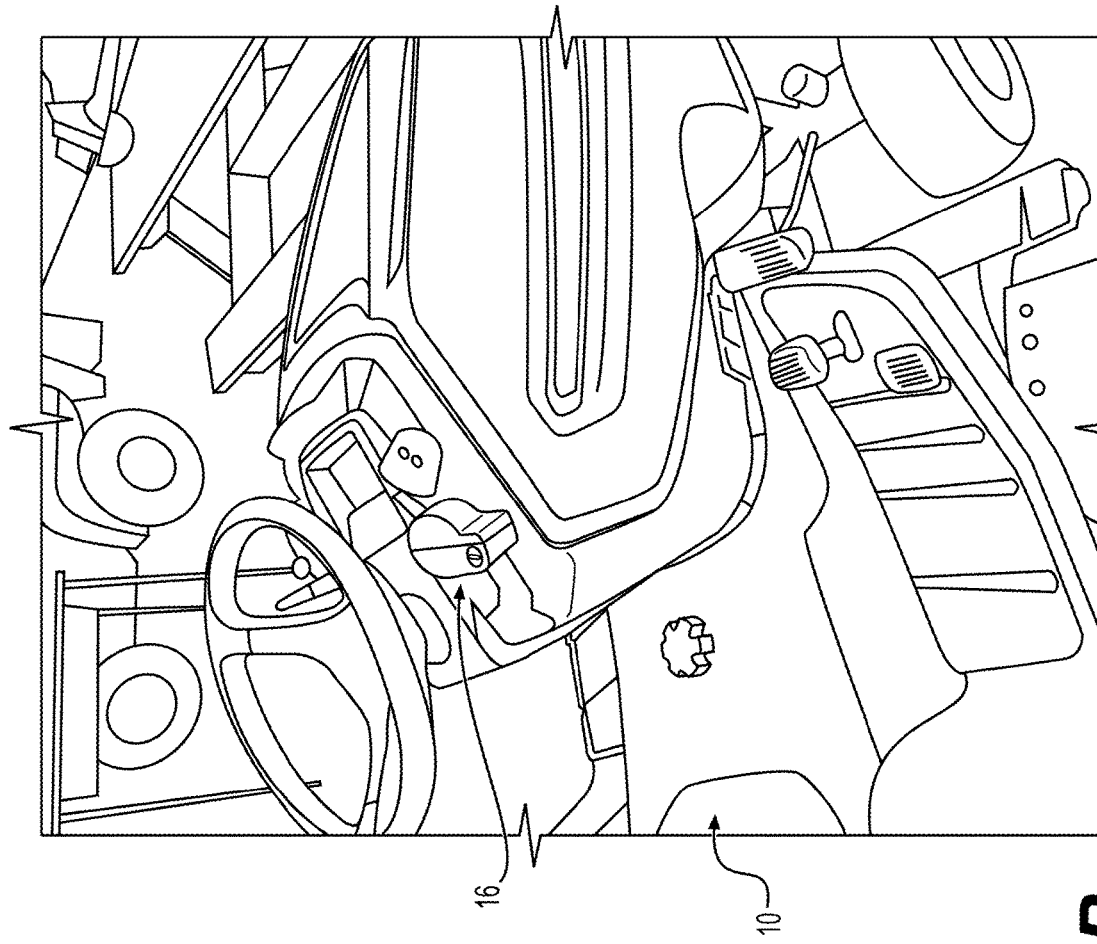
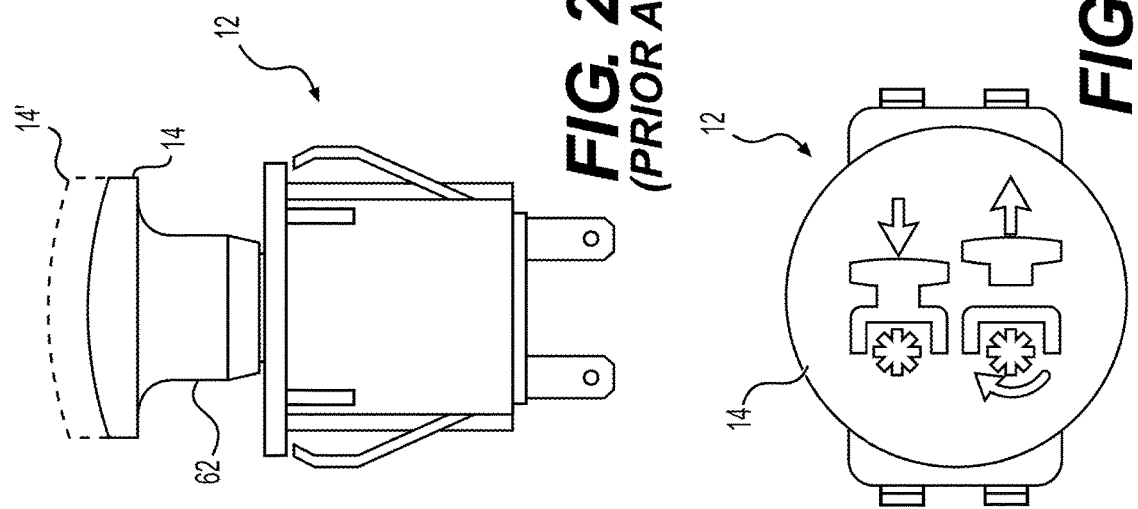
FIG. 3A
FIG. 2A (PRIOR ART)
FIG. 2B (PRIOR ART)

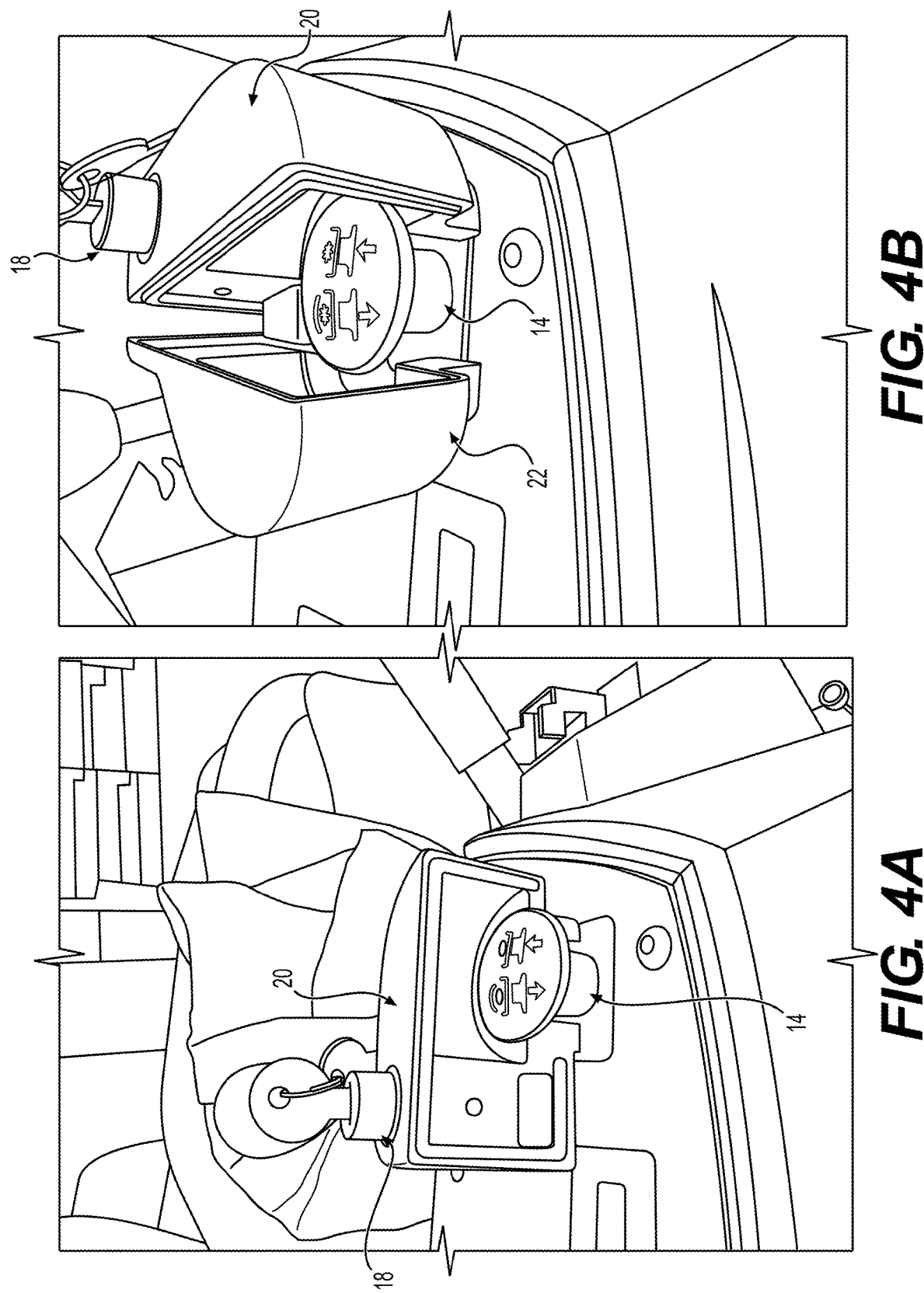

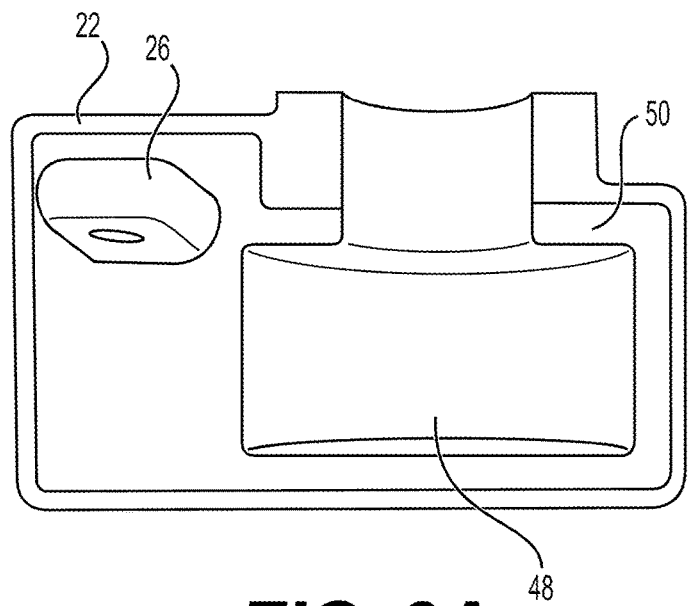
FIG. 8A
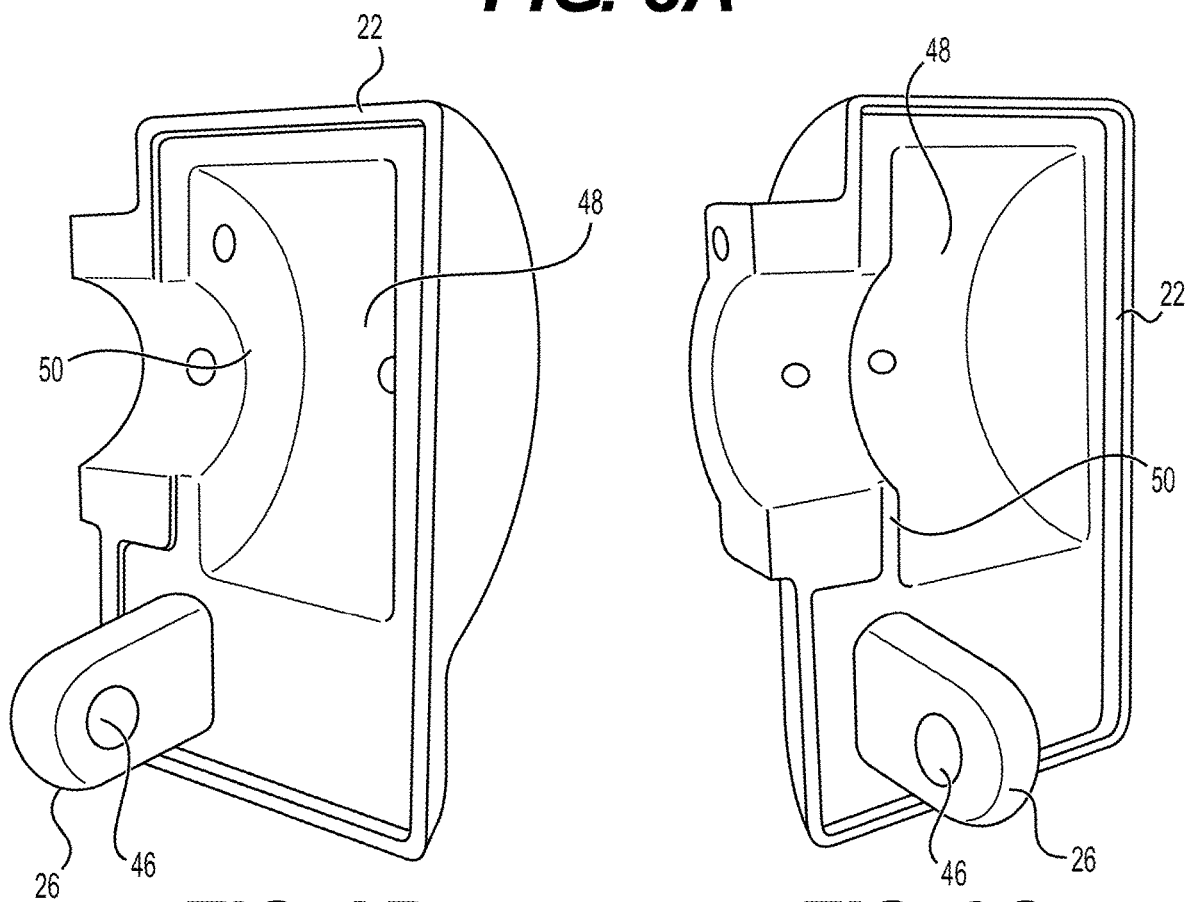
FIG. 8B  FIG. 8C

REMOVABLE LAWN MOWER PTO SWITCH COVER

PRIORITY CLAIM

This application claims the benefit of previously filed U.S. Provisional Patent Application entitled "REMOVABLE LAWN MOWER PTO SWITCH COVER," assigned U.S. Ser. No. 62/979,529, filed Feb. 21, 2020, and which is incorporated herein by reference for all purposes.

FIELD OF THE SUBJECT MATTER

The presently disclosed subject matter generally relates to lawn mower security systems and more particularly to providing the ability to safeguard ride-on style lawn mowers against unauthorized cranking of its engine if the mowers have push/pull mower deck or power-takeoff (PTO) switch technology.

BACKGROUND OF THE SUBJECT MATTER

Various types of ride-on lawn mowers or similar equipment have been provided. FIGS. 1A through 1C illustrate respective different examples of such prior art mowers. As represented, such mowers generally 10 may typically have various features generally in common, such as seats for riders/operators, various steering controls, a keyed electric starter for the engines, and a cutter engagement switch. Often, such switch generally 12 may comprise a switch for controlling/engaging a mower deck or power-takeoff (PTO).

Present FIGS. 2A and 2B illustrate several enlarged, isolated views of an exemplary PTO or mower deck switch generally 12, which has a control knob generally 14. As shown in FIG. 2A, knob 14 may assume (under operator control) a position which is relatively pulled up (as shown by dotted line image 14') in order to engage the associated mower features. Conversely, as will be understood by those of ordinary skill in the art, such knob 14 may be pushed down (by the operator) in order to disengage the mower features.

In particular, FIG. 2A represents a side elevational view of such an isolated switch generally 12, and FIG. 2B represents a top perspective view, showing various illustrations which may be applied to an external surface of knob 14, to inform an operator of such specific control features (i.e., pull up knob 14 to engage mower, and push down knob 14 to disengage).

As will be further understood by those of ordinary skill in the art, switch 12 with its knob 14 also interacts with overall safety or interlocking features of mower generally 10 to effectively prevent the ability to crank mower 10 whenever the mower deck switch is positioned for engaging the mower. In other words, if the mower switch is positioned for engagement in the pulled up position illustrated by knob 14', mower 10 is prevented from being cranked, even by someone who has a key and is otherwise authorized to operate the mower 10. Stated another way, knob 14 must be in the pushed down solid line position of FIG. 2A in order for the mower to be able to be cranked.

Mowers such as represented exemplary devices 10 are relatively expensive, and usually heavy and difficult to move unless cranked and operated. Thus, an unauthorized user who nonetheless has the ability to crank the engine (such as through use of a key or a key copy or otherwise) can commandeer or steal the mower 10. Therefore, being able to prevent unauthorized users from being able to crank a mower greatly contributes to safeguarding the mower.

While various implementations of lawn mower security systems have been developed, no design has emerged that generally encompasses all of the desired characteristics as hereafter presented in accordance with the presently disclosed technology.

SUMMARY OF THE SUBJECT MATTER

In view of the recognized features encountered in the prior art and addressed by the presently disclosed subject matter, improved apparatus and corresponding methodology therefor have been provided for improved lawn mower security systems. More particularly, the presently disclosed subject matter relates to providing the ability to safeguard ride-on style lawn mowers against unauthorized cranking of its engine if the mowers have push/pull mower deck or power-takeoff (PTO) switch technology.

One presently disclosed exemplary embodiment relates to an improved lawn mower security system which facilitates preventing access to or operation of a mower deck or PTO switch, which otherwise is held into an engaged position, to thereby use the safety/interlocking system of the mower to prevent it being cranked.

Per other presently disclosed features, per some presently disclosed exemplary embodiments, the presently disclosed security system nonetheless can be removed from a position which is exterior of the associated mower deck or PTO switch, to enable the mower to be cranked and operated normally.

Per yet other presently disclosed features, per some presently disclosed exemplary embodiments, the presently disclosed security system may be utilized with existing PTO or mower deck switches, without requiring any modifications to such switches.

One presently disclosed exemplary embodiment relates to a lawn mower security system for use with a mower having push/pull mower deck or power-takeoff (PTO) switch interlocking technology to prevent cranking of the mower while the blades are in an engaged drive position thereof. Such embodiment preferably may comprise a pair of matable reinforced housing members configured to be received about a push/pull mower deck switch with such mower switch at least partially received in an internally formed cavity of such matable housing members, such matable housing members further defining adjacent such internally formed cavity a stop wall for preventing the mower switch from being depressed or pushed in into a disengaged position thereof; and a key-actuated locking mechanism combinable with such housing members when mated, for removably joining such housing members. Per such exemplary embodiment, such interlocking technology prevents such mower from being cranked whenever such pair of matable reinforced housing members are received about such deck switch and secured by such key-actuated locking mechanism.

Yet another exemplary embodiment preferably relates to a removable lawn mower PTO switch cover, comprising a first component comprised of relatively heavier-gauge metals, forming an internal partial cavity and a protruding metal loop; a second component comprised of relatively heavier-gauge metals, forming an internal partial cavity and an internal opening for receiving such protruding metal loop whenever such first and second components are joined; an extendable actuator lock receivable by such second component so that actuation of such lock extendable actuator interacts with such protruding metal loop of such first component for selectively joining such first and second components together, with such partial cavity thereof received about such lawn mower PTO switch; and an internal stop wall defined by such components for preventing such lawn mower PTO switch from being depressed whenever such components are received about such lawn mower PTO switch.

Those of ordinary skill in the art upon review of the complete disclosure herewith will appreciate that the presently disclosed subject matter equally relates to corresponding and/or associated methodologies. For example, one exemplary such methodology relates to methodology for preventing unauthorized cranking of a lawn mower having push/pull mower deck or power-takeoff (PTO) switch interlocking technology to prevent cranking of the mower while the blades are in an engaged drive position thereof. Such exemplary methodology may preferably comprise providing two reinforced components which when combined form an interior chamber for receiving the knob of a mower PTO switch, blocking the ability to push in the knob; and selectively, securely joining the two components with a knob of the mower PTO switch received therein, and blocked from being pushed in to a disengaged drive position thereof. Per such methodology, the existing interlocking technology of the mower is used in order to prevent unauthorized cranking of the mower.

Additional objects and advantages of the presently disclosed subject matter are set forth in, or will be apparent to those of ordinary skill in the art from, the detailed description herein. Also, it should be further appreciated that modifications and variations to the specifically illustrated, referenced, and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIGS. 2A and 2B illustrate respective side elevation and top perspective views of isolated, enlarged illustrations of representative prior art mower deck or PTO switches, such as provided in the prior art mowers of FIGS. 1A through 1C, and with which the presently disclosed subject matter may be practiced in combination so as to externally safeguard such equipment and/or mower from unauthorized operation and/or theft;

FIG. 3A illustrates a generally side perspective view of an exemplary existing ride-on mower having a mower deck or PTO switch, and shown in combination with a presently disclosed security device combined in association with such switch;

FIG. 4A represents one exemplary step in presently disclosed methodology of applying and/or removing a presently disclosed security device to the mower deck or PTO switch of an exemplary existing ride-on mower, such as represented in subject FIG. 3A;

FIG. 4B represents another exemplary step in presently disclosed methodology of applying and/or removing a presently disclosed security device to the mower deck or PTO switch of an exemplary existing ride-on mower, such as represented in subject FIG. 3A;

FIGS. 8A through 8E illustrate respective perspective and side views of one exemplary main component of a presently disclosed security device, and intended to be joined to another main component thereof, at least in part through interaction of a protruding metal loop of such one main component variously represented in such FIGS. 8A through 8E;

Figure 1A:
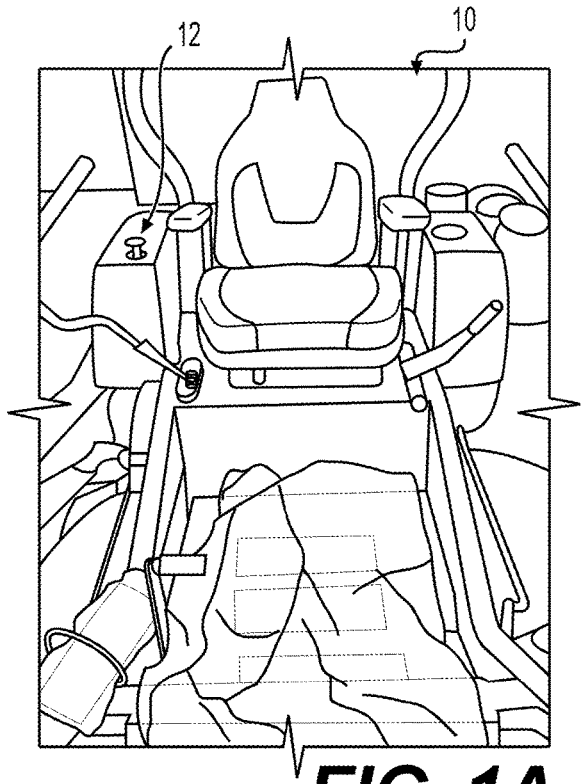
FIGS. 1A through 1C illustrate generally front perspective views of different prior art ride-on mowers, but each of which have PTO or mower deck switches with which the presently disclosed subject matter may be practiced in combination so as to externally safeguard such equipment from unauthorized operation and/or theft, all without any modifications to such existing features or mowers themselves.

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As discussed in the Summary of the Subject Matter section, the presently disclosed subject matter is generally concerned with apparatus and methodologies generally relating to lawn mower security systems, and more particularly to providing the ability to safeguard ride-on style lawn mowers against unauthorized cranking of its engine if the mowers have push/pull mower deck or power-takeoff (PTO) switch technology.

Selected combinations of aspects of the presently disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of one or more other embodiments to yield yet further embodiments. Additionally, certain features may be interchanged with similar devices or features not expressly mentioned which perform the same or similar function or functions.

Reference will now be made in detail to the presently preferred exemplary embodiments of the subject apparatus and associated and/or related methodology.

Figure 1B:
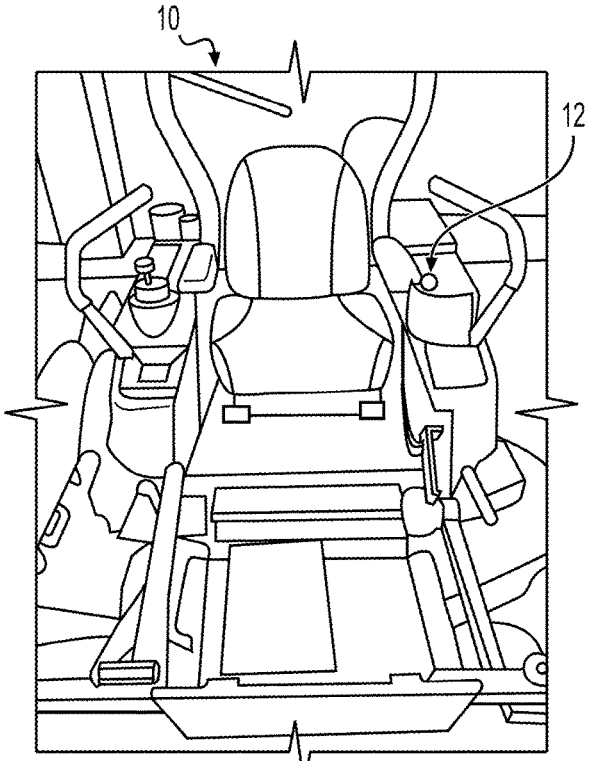
Figure 1C:
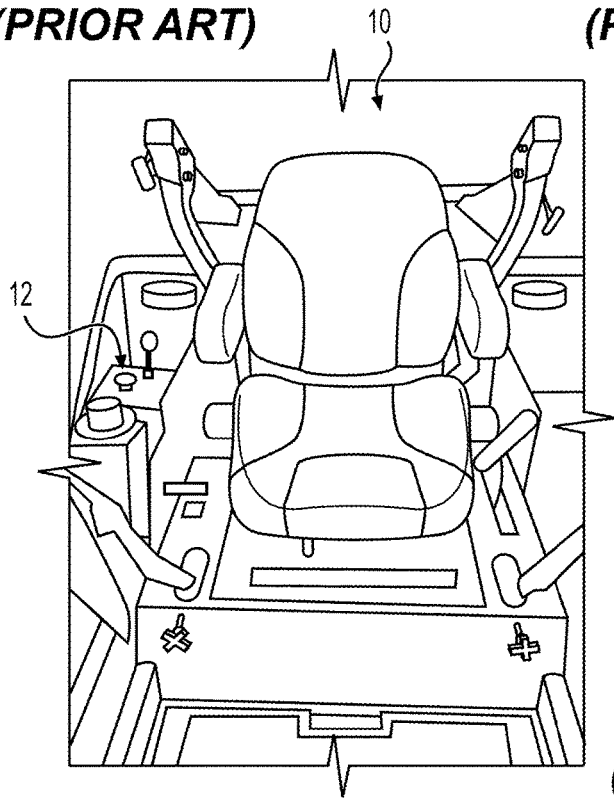

FIGS. 1A through 1C illustrate generally front perspective views of different prior art ride-on mowers generally 10, but each of which have PTO or mower deck switches generally 12. In present embodiments of presently disclosed subject matter, security system features may be practiced in combination with such switch 12 and its associated mower safety/control systems so as to externally safeguard such equipment from unauthorized operation and/or theft, all without any modifications to such existing features or the mowers themselves. In particular, mowers with such switches 12 generally have safety and/or interlock features which prevent the mower engine from being cranked while the mower blades or mower deck is engaged for operation.

FIGS. 2A and 2B illustrate respective side elevation and top perspective views of isolated, enlarged illustrations of representative prior art mower deck or PTO switches 12, such as provided in the prior art mowers 10 of FIGS. 1A through 1C, and with which the presently disclosed subject matter may be practiced in combination so as to externally safeguard such equipment and/or mower from unauthorized operation and/or theft. As noted above, exemplary PTO or mower deck switch 12 has a control knob generally 14. As shown in FIG. 2A, knob 14 may assume (under operator control) a position which is relatively pulled up (as shown by dotted line image 14') in order to engage the associated mower features. Conversely, as will be understood by those of ordinary skill in the art, such knob 14 may be pushed down (by the operator) in order to disengage the mower features. Stated another way, switch 12 with its knob 14 interacts with overall safety or interlocking features of mower 10 to effectively prevent the ability to crank mower 10 whenever the mower deck switch 12 is positioned for engaging the mower. In other words, if the mower switch is positioned for engagement in the pulled up position illustrated by knob 14', mower 10 is prevented from being cranked, even by someone who has a key and is otherwise authorized to operate the mower 10. Stated another way, knob 14 must be in the pushed down solid line position of FIG. 2A in order for the mower to be able to be cranked.

As also represented in FIGS. 2A and 2B, switch 12 is an electrical switch, with electrical contacts for interconnection with electrical circuits of mower 10 as part of the existing and known safety/interlock features referenced herein.

FIG. 3A illustrates a generally side perspective view of an exemplary existing ride-on mower 10 having a mower deck or PTO switch (not seen), and shown in combination with a presently disclosed security device generally 16 combined in association with (mounted on) such switch. FIG. 3B illustrates a generally enlarged perspective view of another exemplary existing ride-on mower 10 having a mower deck or PTO switch (not seen), and shown in combination with a presently disclosed security device generally 16 operatively combined in association with such switch. When security device 16 is mounted (locked into position) as illustrated in FIG. 3B, the engine of mower 10 is prevented from being cranked because the switch enclosed by device 16 can not be pushed in to the required position for cranking. Instead, such enclosed switch is forced to remain in its pulled out position, which interlocks against cranking the engine. When switch 14 is pulled out (dotted line position 14' of FIG. 2A), the blades can be rotated by the engine (as represented by the curved arrow representation of FIG. 2B). FIG. 3B illustrates a cylinder lock feature generally 18 (with an inserted associated key set) by which the device 16 is secured into the illustrated position.

Figure 3C:
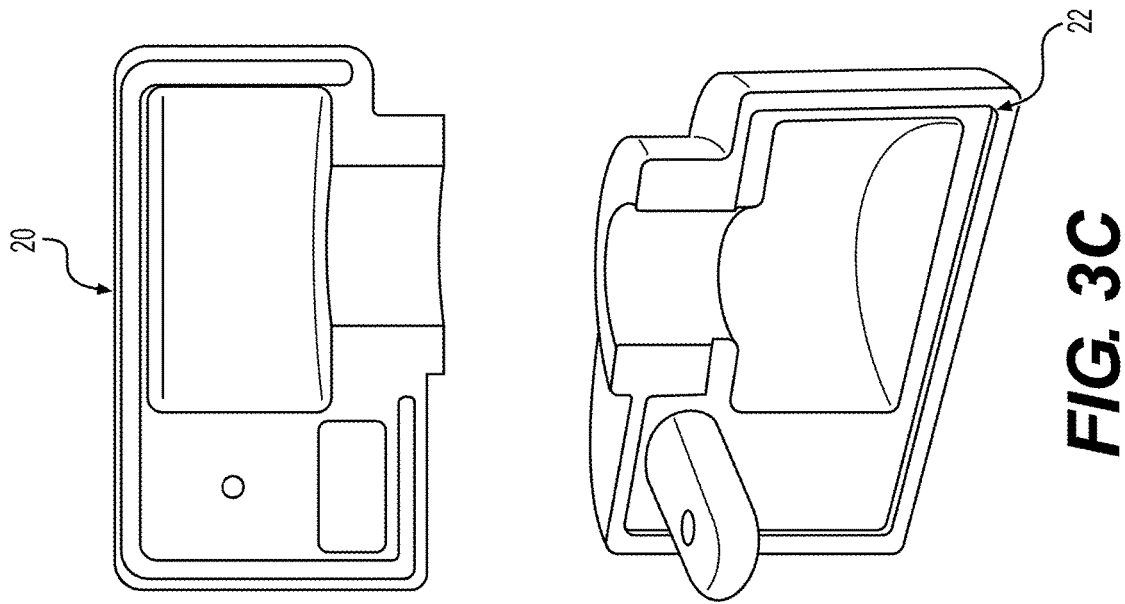
FIG. 3C shows an enlarged view of two major components of the presently disclosed security device shown in FIGS. 3A and 3B but separated from each other and from the mower deck or PTO switch of an exemplary existing ride-on mower.
Figure 3B:
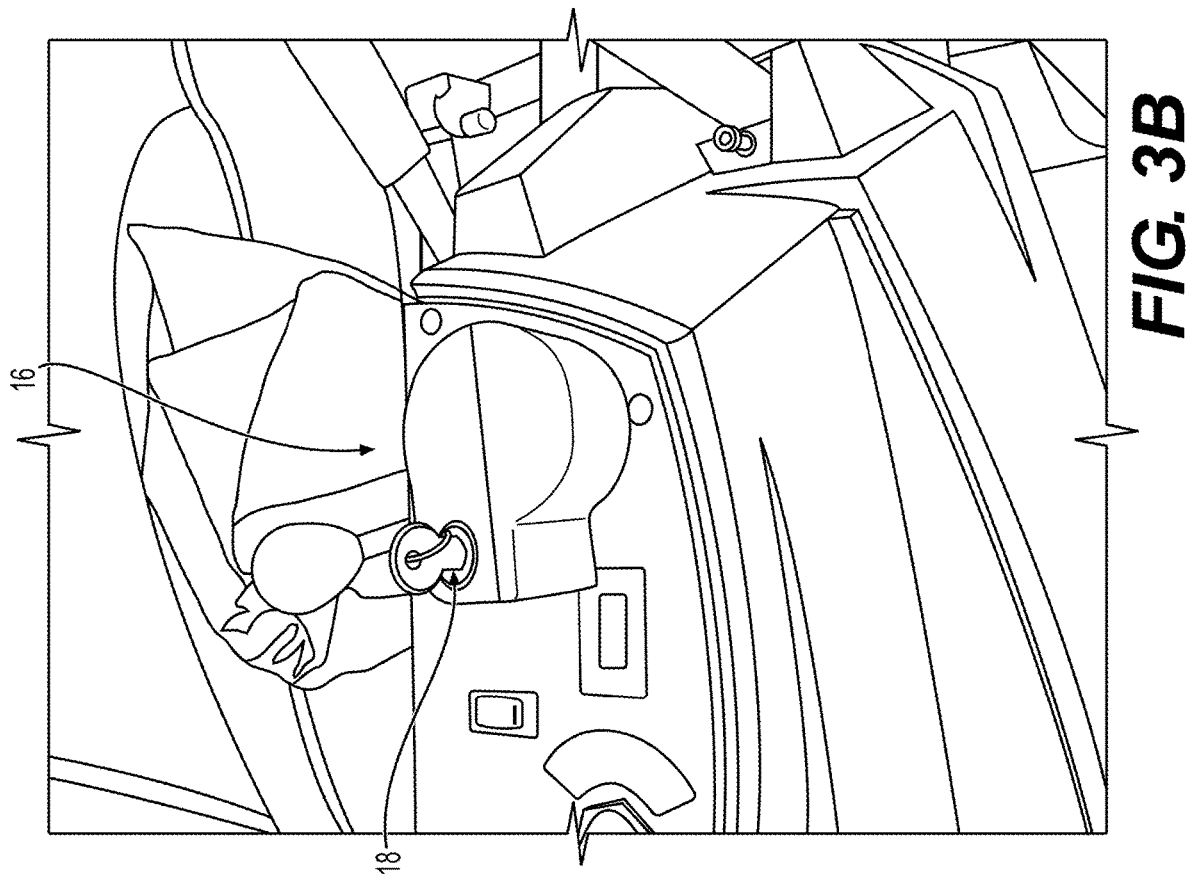
FIG. 3B illustrates a generally enlarged perspective view of another exemplary existing ride-on mower having a mower deck or PTO switch, and shown in combination with a presently disclosed security device combined in association with such switch.

FIG. 3C shows an enlarged view of two major components generally 20 and 22 of the presently disclosed security device generally 16 as shown in FIGS. 3A and 3C, but separated from each other and from the mower deck or PTO switch 12 of an exemplary existing ride-on mower 10. As otherwise disclosed herewith in conjunction with other Figures, the two components 20 and 22 when combined form an interior chamber for receiving knob 14 of switch 12, but also blocking the ability to push in knob 14. Also as otherwise disclosed, component 22 includes a protruding metal loop which is inserted into a receptacle portion of component 20 and then selectively engaged by a feature of associated cylinder lock 18 in order to secure components 20 and 22 together and in place surrounding control knob 14 or switch 12.

FIG. 4A represents one exemplary step in presently disclosed methodology of applying and/or removing a presently disclosed security device 16 to the mower deck or PTO switch with knob 14 of an exemplary existing ride-on mower 10, such as represented in subject FIG. 3A. FIG. 4B represents another exemplary step in presently disclosed methodology of applying and/or removing a presently disclosed security device 16 to the mower deck or PTO switch with knob 14 of an exemplary existing ride-on mower 10, such as represented in subject FIG. 3A.

In particular, per FIG. 4A, a component 20 of a presently disclosed device is partially received about a knob 14, with the lower portion of a knob-receiving chamber situated between a lower side of the knob 14 and a portion of the mower, to prevent knob 14 from being pushed in to its engaged position. A cylinder lock 18 is represented as partially received into a receiving portion of component 20. FIG. 4B represents the second component 22 also being brought into position for surrounding knob 14, but not yet positioned so that components 20 and 22 fully enclose the knob 14. Since they are not fully positioned for closure, again cylinder lock 18 is shown only partially disposed into component 20. While FIGS. 4A and 4B represent the consecutive application of first component 20 and then component 22, those of ordinary skill in the art will understand from the completion disclosure herewith that such Figures equally represent the steps of removing components 20 and 22 from knob 14, first with the components being separated from each other (FIG. 4B) and then with one of the components (22) being removed entirely from the other (FIG. 4A).

Figure 5A:
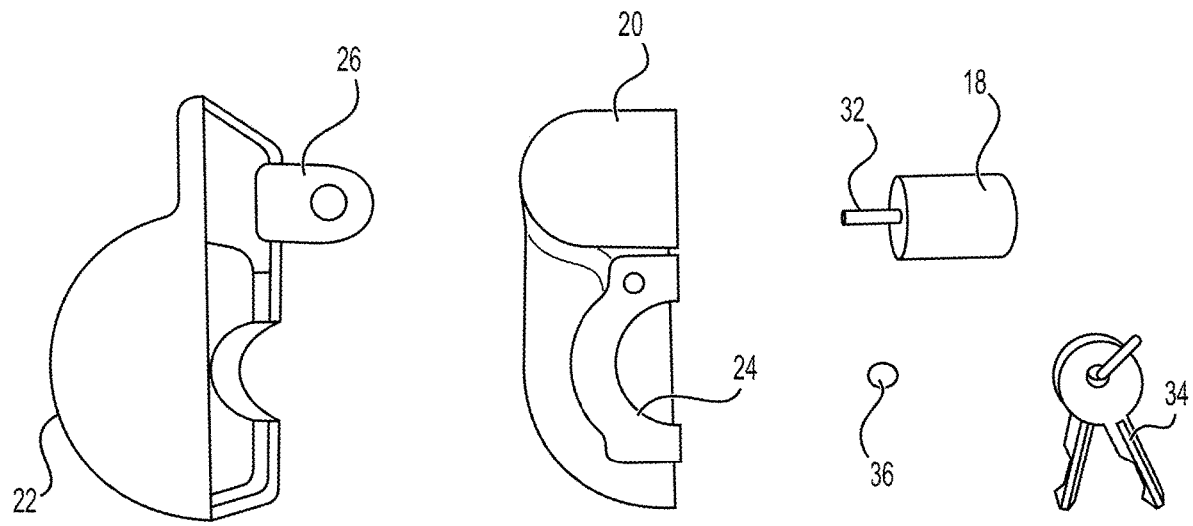
FIGS. 5A and 5B illustrate in various perspective views a collection of elements which together provide a presently disclosed lawn mower security system for use with the mower deck or PTO switch of an exemplary existing ride-on mower, such as represented in subject FIG. 3A.
Figure 5B:
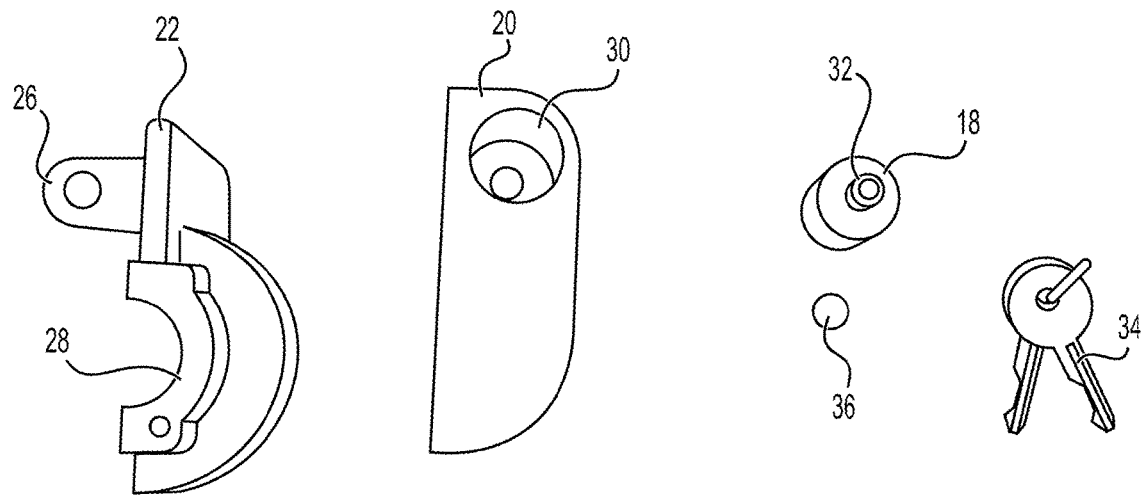

FIGS. 5A and 5B illustrate in various perspective views a collection of elements which together provide a presently disclosed lawn mower security system for use with the mower deck or PTO switch of an exemplary existing ride-on mower, such as represented in subject FIG. 3A. In particular, each of FIGS. 5A and 5B illustrate in various positions the matable components 20 and 22 as well as the cylinder lock feature generally 18, all as otherwise described herein. In general, FIG. 5A illustrates a generally side perspective view of component 20, including representation of a lower curved lip or region generally 24 against which knob 14 may in part be trapped to secure it from moving into its pushed in position. Matable component 22 is shown in a generally side perspective view, and illustrating a metal loop member generally 26 protruding therefrom, for interaction with component 20.

FIG. 5B also shows generally side perspective views for each of components 20 and 22, but generally showing the sides thereof respectively opposite those as seen in FIG. 5A. Accordingly, while metal loop member generally 26 is again seen, a curved lower lip or region generally 28 of component 22 is also shown. Such curved region 28 of component 22 operates generally in a complementary position opposite curved region 24 of component 20 whenever such matable components 20 and 22 are brought together, in order to help capture knob 14. A cylindrical opening generally 30 is formed by component 20 on such opposite side thereof, for receiving correspondingly sized cylindrical lock feature 18. Such lock 18 includes an actuator component generally 32 as otherwise discussed herein, as well as an associated key set 34. As further discussed herein in conjunction with other present Figures, a set screw generally 36 or similar may be used for securing cylindrical lock 18 into component 20. That means that cylindrical lock 18 can be readily replaced by an authorized user, for changing out the keys, or for other reasons. However, the seated location of such set screw is concealed from external access whenever components 20 and 22 are mated and joined together for protecting against unauthorized operation of an enclosed knob 14.

Figure 6C:
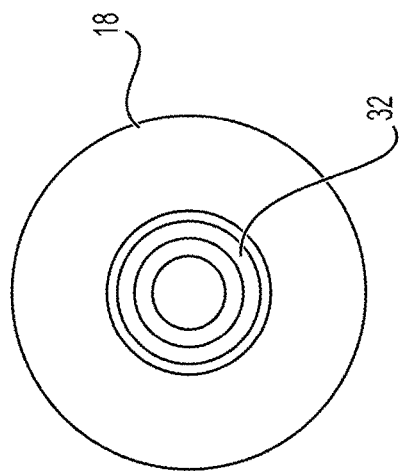
FIG. 6C is an end view of the exemplary cylinder lock of present FIG. 6B, looking into the actuator end thereof.
Figure 6A:
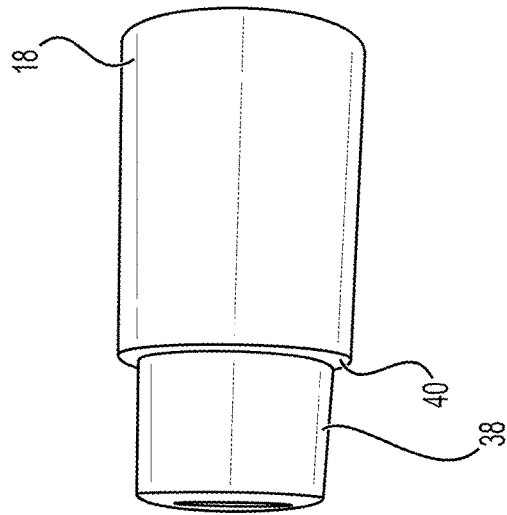
FIG. 6A illustrates an exemplary cylinder lock and key set which may be practiced in some embodiments of a combination with presently disclosed subject matter.
Figure 6B:
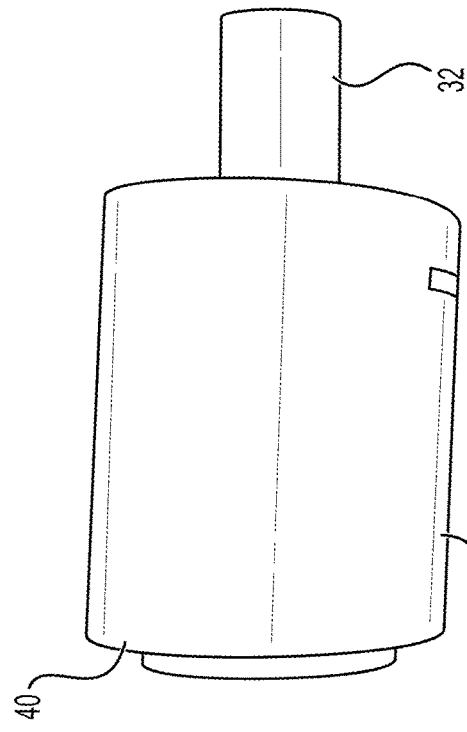
FIG. 6B illustrates an enlarged side view of the exemplary cylinder lock of present FIG. 6A, with an actuator element thereof in an extended position.

FIG. 6A illustrates an exemplary cylinder lock 18 and key set 34 which may be practiced in some embodiments of a combination with presently disclosed subject matter. FIG. 6B illustrates an enlarged side view of the exemplary cylinder lock 18 of present FIG. 6A, with an actuator element 32 thereof in an extended position. FIG. 6C is an end view of the exemplary cylinder lock 18 of present FIG. 6B, looking into the actuator 32 end thereof. It will be understood by those of ordinary skill in the art that cylindrical lock 18 also includes another retractable element portion 38 which actually receives one of the members of the key set 34. Operation of the key set 34 within retractable element 38 allows such retractable portion to be seated generally flush with, or close to flush with, an edge surface generally 40 of lock 18, to in turn cause actuator element 32 to be extended, into the respective positions of elements 32 and 38 as represented by present FIG. 6B. In such positions, the extended actuator element 32 may engage an opening in metal loop 26 of component 22, for securing components 20 and 22 together, as otherwise understood from the complete disclosure herewith.

Figure 7B:
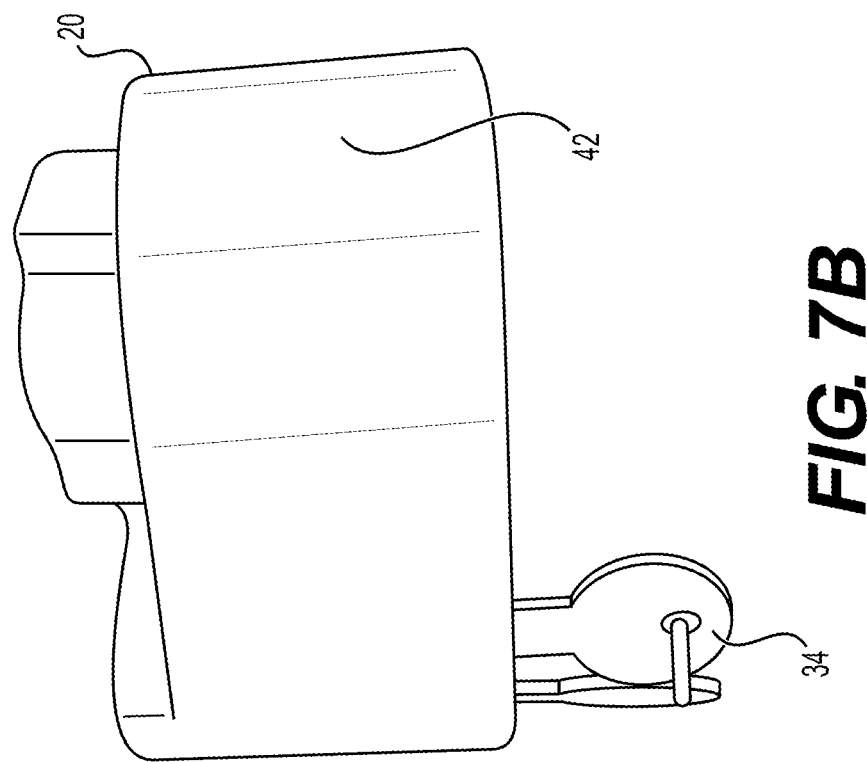
FIG. 7B illustrates another side view of the exemplary subject matter of present FIG. 7A but combined together, including installation of an associated cylinder lock feature, and with one member of an associated key set seated therein.
Figure 7A:
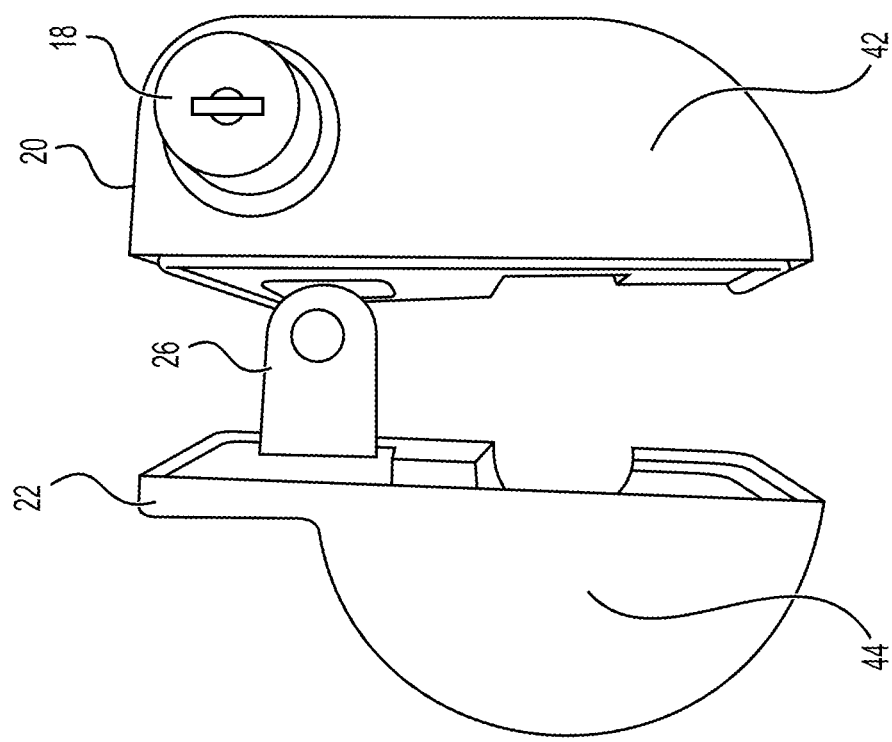
FIG. 7A illustrates one external side view of two main security components separate from each other, but with a partially installed cylinder lock feature, all in accordance with presently disclosed subject matter.
Figure 8D:
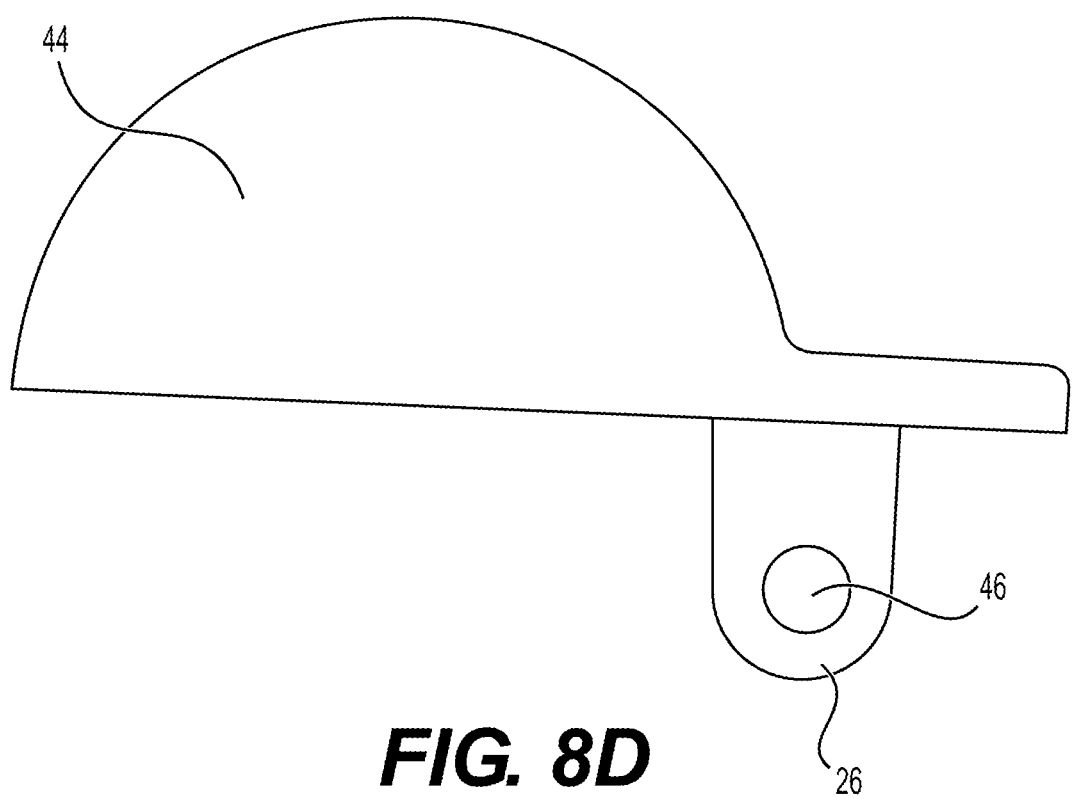
Figure 8E:
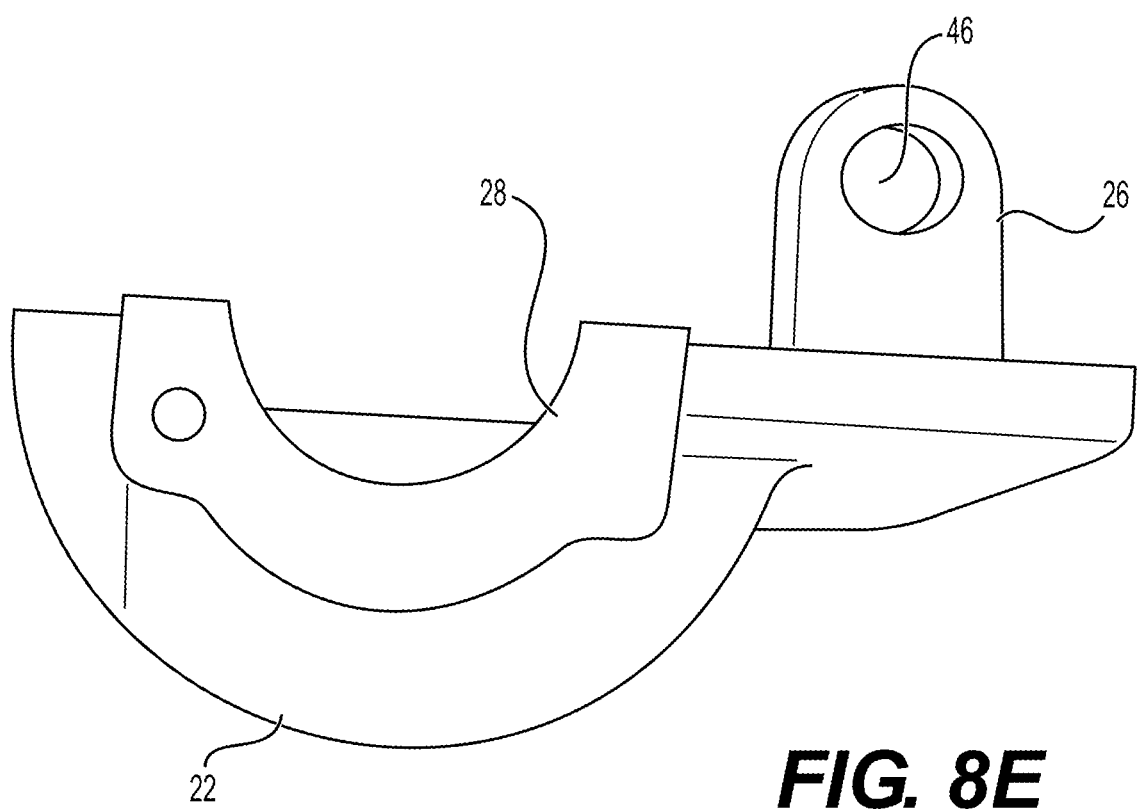

FIG. 7A illustrates one external side view of two main security components 20 and 22 separated from each other, but with a partially installed cylinder lock feature 18, all in accordance with presently disclosed subject matter. Components 20 and 22 are positioned opposite to each other as needed in order to mate them with metal loop feature 26 entering into component 20 to be secured by an extendable actuator portion of lock 18. FIG. 7B illustrates another side view of the exemplary subject matter of present FIG. 7A but combined together, including installation of the associated cylinder lock feature 18, and with one member of an associated key set 34 seated therein. For ease of illustration, a knob 14 is not illustrated in the combined security device features illustrated in FIG. 7B.

As shown in FIG. 7A, components 20 and 22 respectively include enlarged regions generally 42 and 44. When components 20 and 22 are operatively mated together, such enlarged regions 42 and 44 are situated opposite one another, to form a composite enlarged region for receiving a knob 14, as otherwise discussed herein.

FIGS. 8A through 8E illustrate respective perspective and side views of one exemplary main component generally 22 of a presently disclosed security device, and intended to be joined to another main component 20 thereof, at least in part through interaction of a protruding metal loop 26 of such one main component 22 variously represented in such FIGS. 8A through 8E. In particular, such metal loop 26 includes an opening 46 defined by the extended portion of member 26. Such opening 46 is sized for being a close fit with the diameter of actuator 32 of lock 18. In other words, with actuator 32 received into opening 46, the components 20 and 22 are mateably but removably (with a key) secured together.

The concave side of convex enlarged feature 44 of component 22 forms a cavity generally 48 which cooperates with a portion of component 20 for receiving an associated knob 14, as otherwise discussed herein. A terminal side of such cavity 48 with curved region 28 forms a wall or edge 50 which serves as a stop against knob 14 being depressed or pushed in into a disengaged position thereof.

Figure 9A:
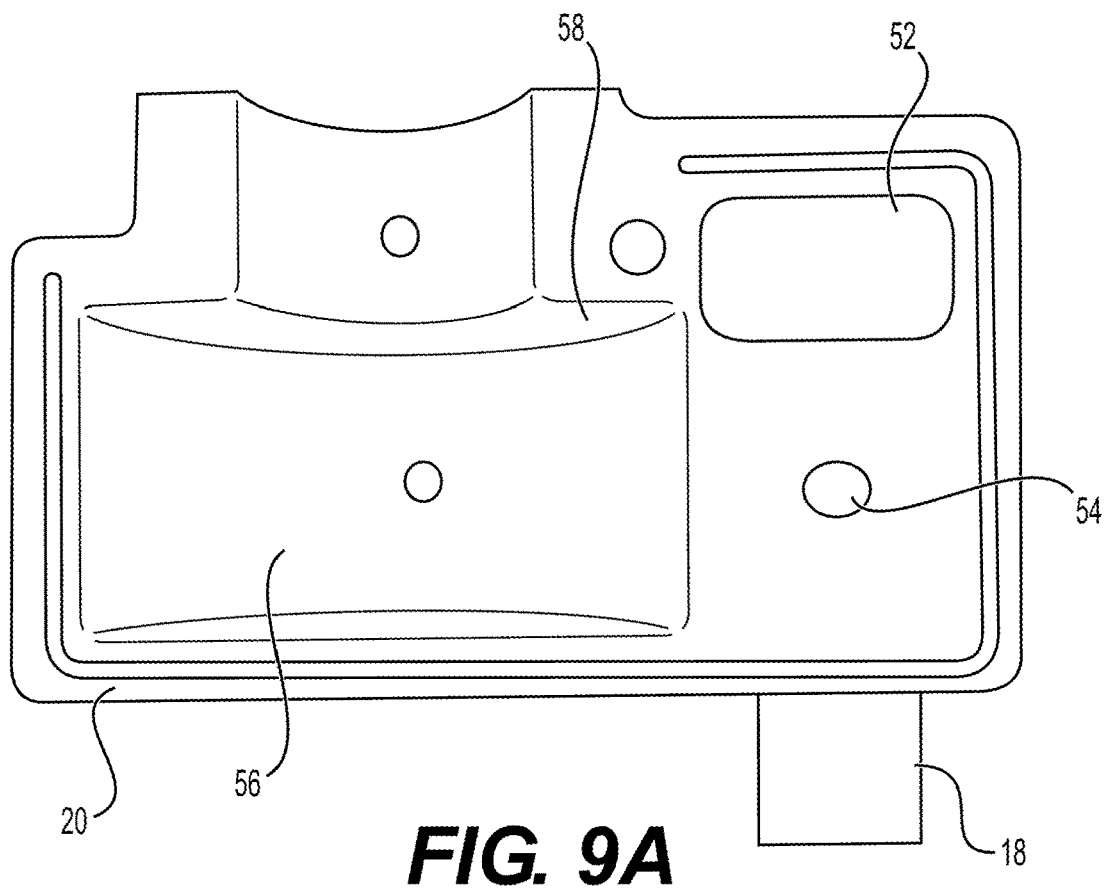
FIGS. 9A through 9F illustrate respective perspective and side views of another exemplary main component of a presently disclosed security device, intended to be joined to the exemplary main component of FIGS. 8A through 8E, and interacting with an exemplary cylinder lock as otherwise disclosed herein, with such interaction further represented in subject FIGS. 9A, 9B, and 9F.
Figure 9B:
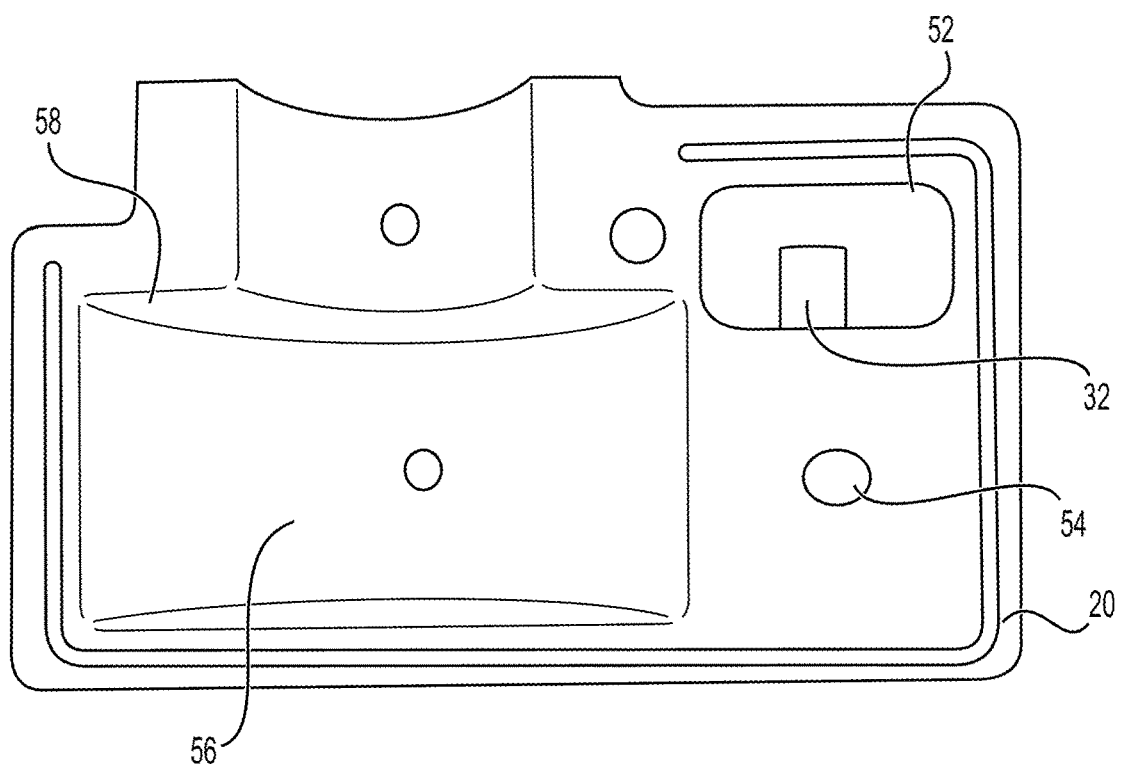
Figure 9C:
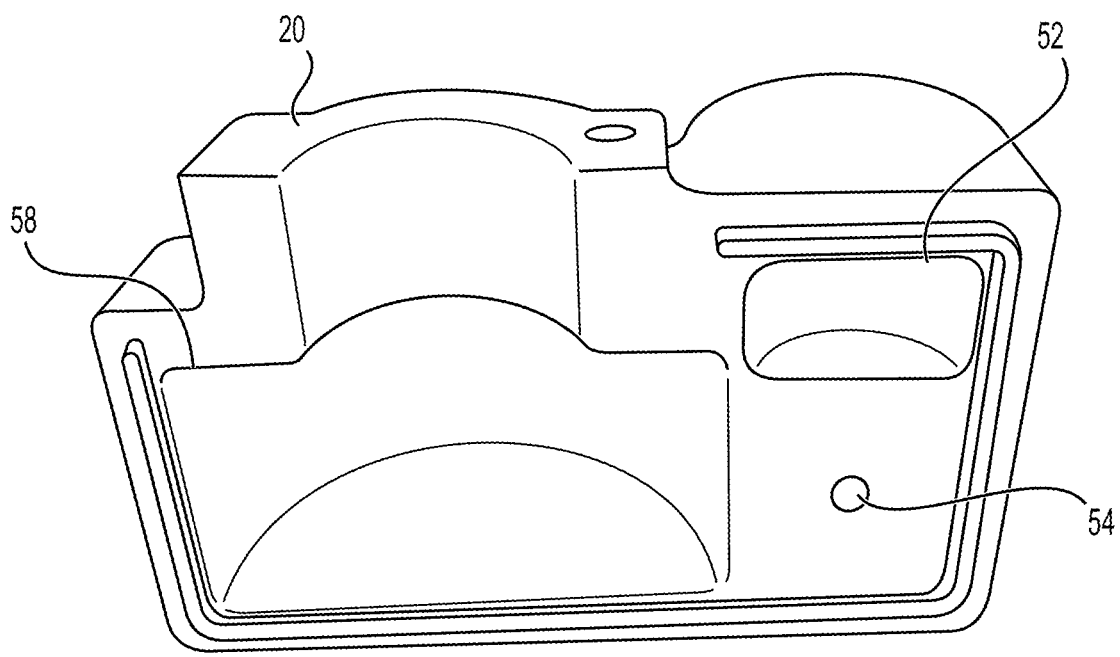
Figure 9D:
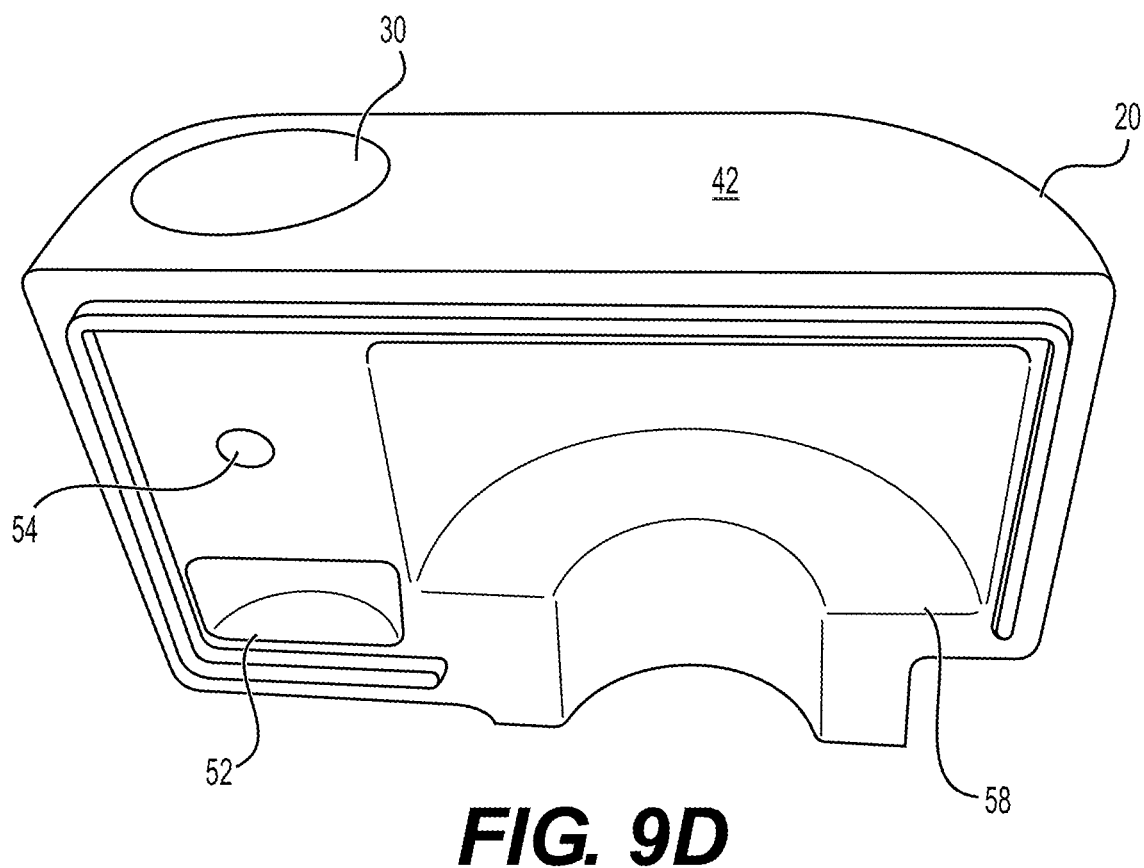
Figure 9E:
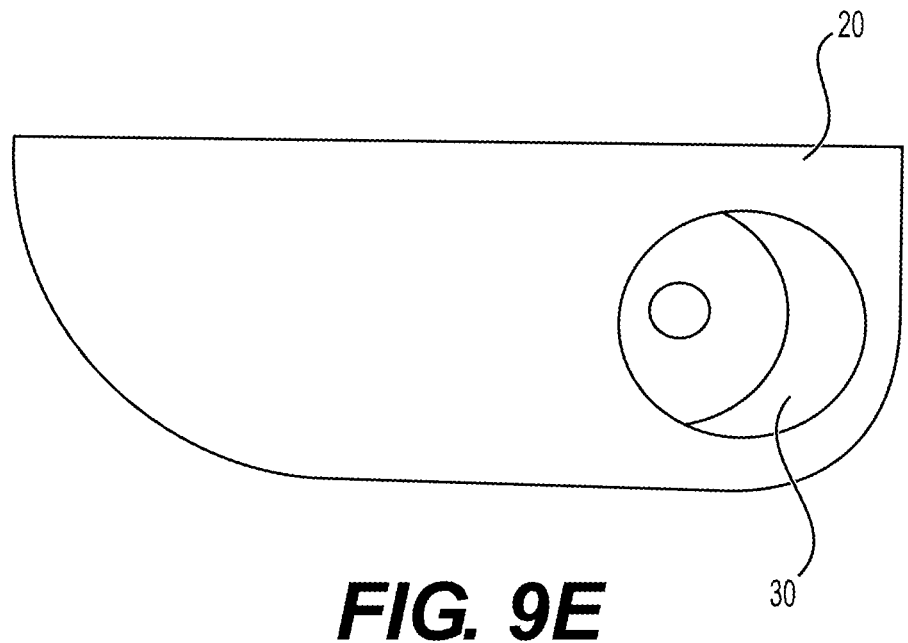
Figure 9F:
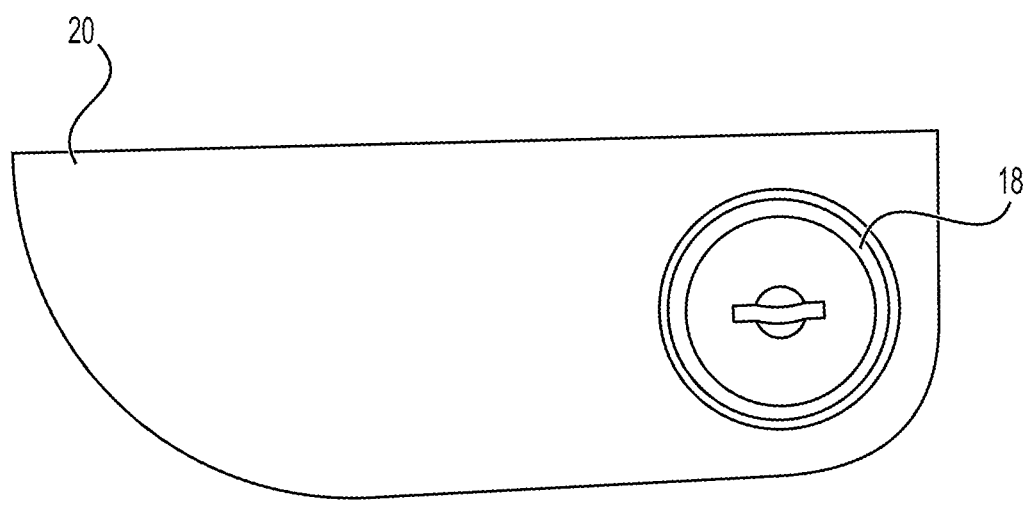

FIGS. 9A through 9F illustrate respective perspective and side views of another exemplary main component 20 of a presently disclosed security device, intended to be joined to the exemplary main component 22 of FIGS. 8A through 8E, and interacting with an exemplary cylinder lock 18 as otherwise disclosed herein, with such interaction further represented in subject FIGS. 9A, 9B, and 9F. Such lock 18 feature is not present in the illustrations of FIGS. 9C, 9D, and 9E.

In particular, opening 30 of component 20 is an elongated cylindrical opening designed to accommodate cylinder lock 18. Interior opening generally 52 within component 20 is designed to accommodate protruding metal loop feature 26 of component 22. As represented by FIG. 9B, the extendable actuator 32 of lock 18 may be extended in order to engage loop 26 within opening 52, to secure components 20 and 22 together.

A smaller preferably threaded opening 54 may be provided in the interior of component 20, to receive a set screw generally 36 therein, by which the seated body of a lock 18 may be secured within elongated opening 30 of component 20. Such interior position means that it is concealed from external access, once the two components 20 and 22 are mated and locked together.

An enlarged interior chamber or region generally 56 is formed, generally opposite the external enlarged region 42 of component 20. When components 20 and 22 are joined, such region 56 cooperates with region 48 of component 22 in order to form an interior chamber for receiving and entrapping knob 14. Similar to the stop wall 50 of such region 48, region 56 has a stop wall 58 formed to interact with associated knob 14 to restrict its travel, and to prevent knob 14 from being pushed in to a disengaged position. So, together, stop walls 50 and 58 help to prevent an associated mower engine from being started.

Figure 10A:
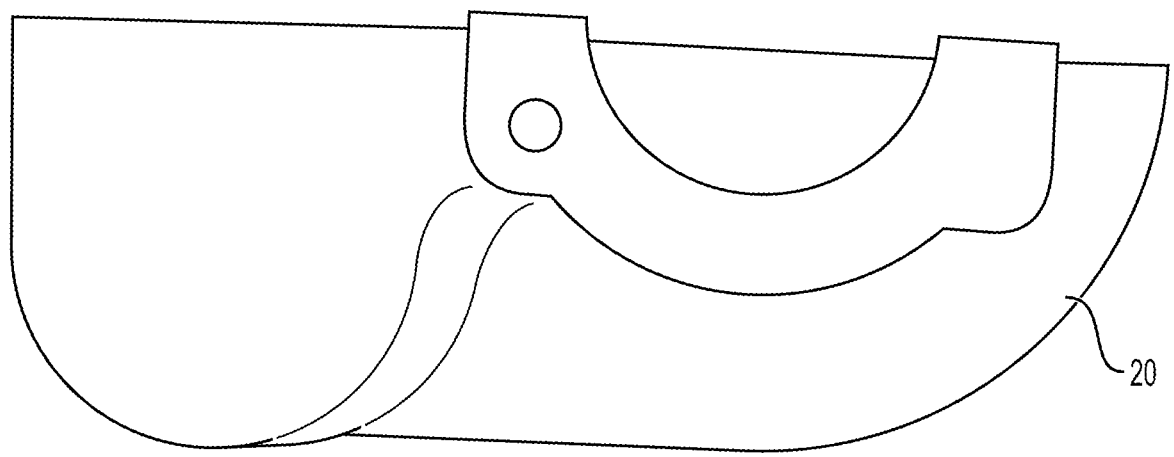
FIGS. 10A through 10D illustrate various further perspective and side views of the exemplary component subject matter of present FIGS. 9A through 9F but in isolation and with no interaction with an exemplary cylinder lock.
Figure 10B:
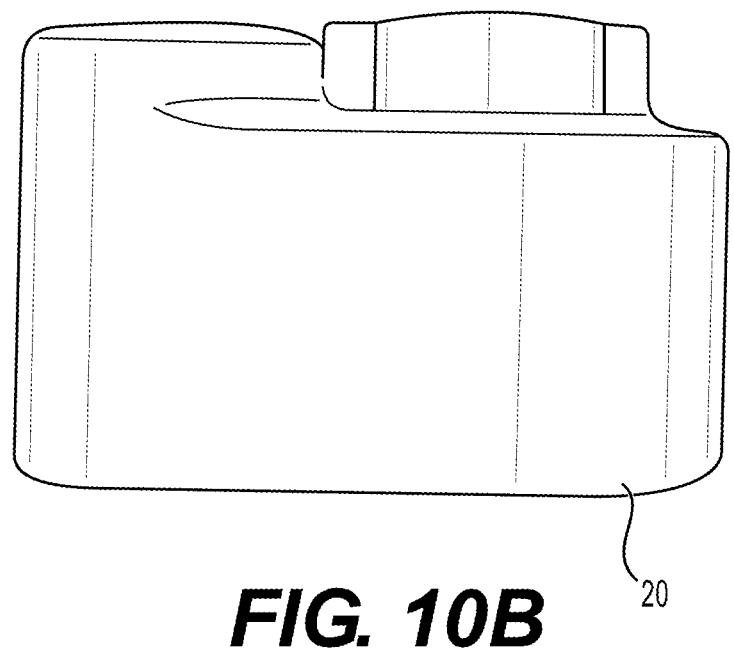
Figure 10D:
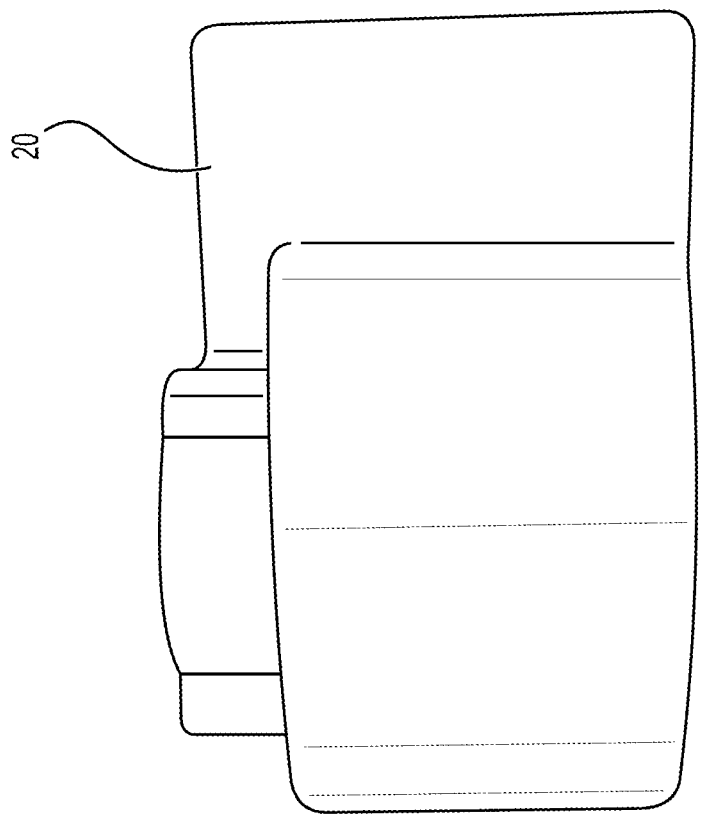
Figure 10C:
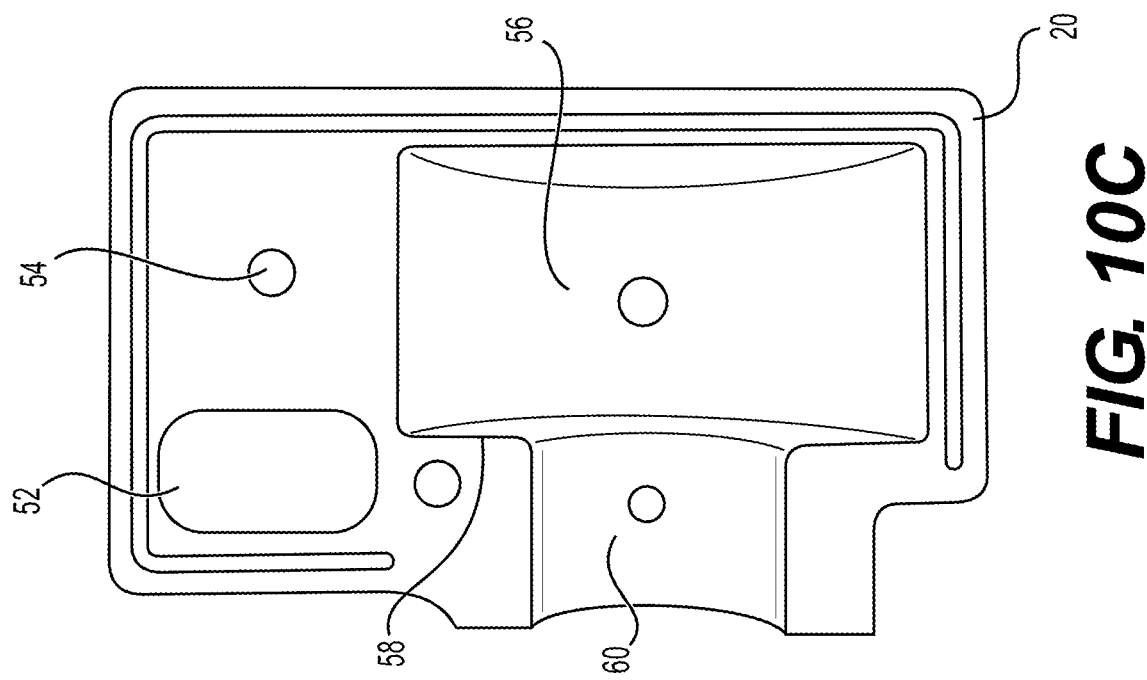

FIGS. 10A through 10D illustrate various further perspective and side views of the exemplary component 20 subject matter of present FIGS. 9A through 9F but in isolation and with no interaction with an exemplary cylinder lock 18. In particular, FIG. 10C represents that an additional channel 60 is formed passing from interior region 56 of component 20. The diameter of such channel 60 is much smaller than that of region 56, with the difference between the two helping to define the stop wall 58 which otherwise surrounds channel 60. As otherwise understood from the complete disclosure herewith, knob 14 has a reduced diameter portion generally 62 (see FIG. 2A) which interconnects the knob 14 together with the remainder of switch 12. Channel 60 provides a passage for such knob 14, when cooperating with the a similar, corresponding feature formed in component 22.

Figure 11A:
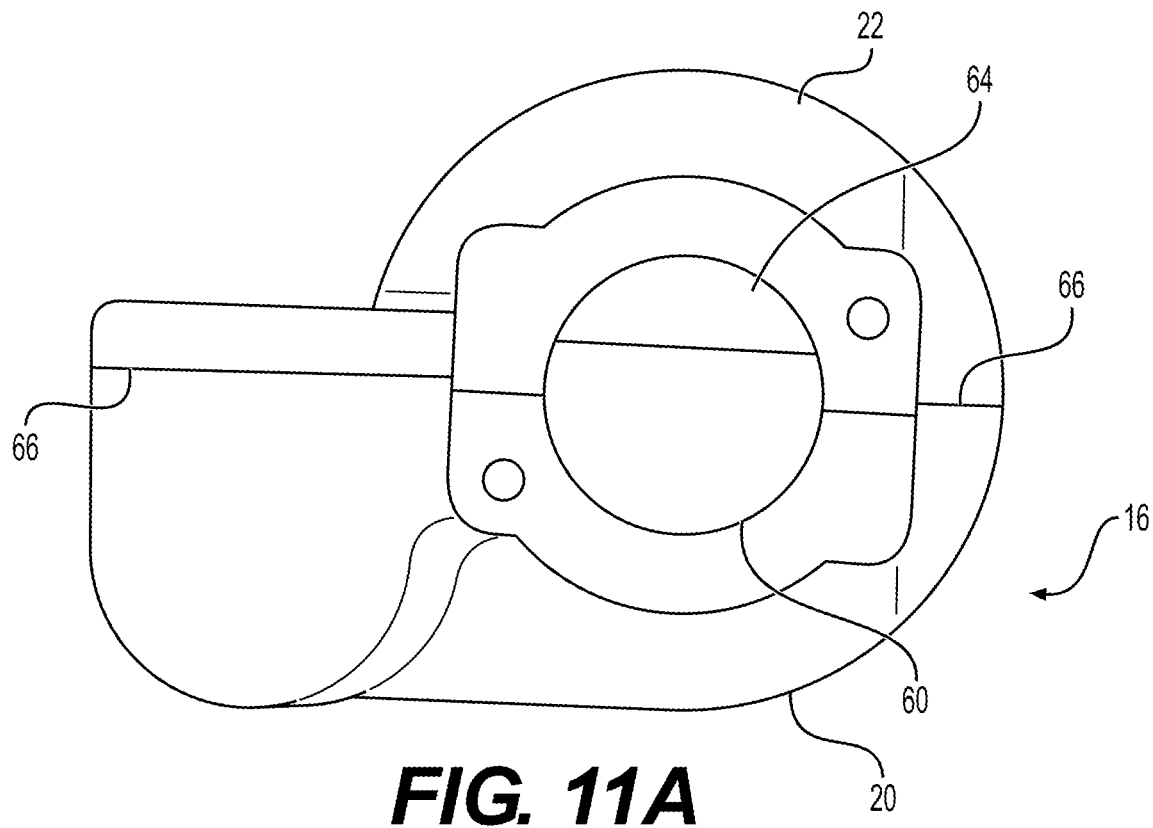
FIGS. 11A through 11D illustrate various perspective and side views, representing the two main components of FIGS. 8A through 8E and 9A through 9F joined together with an associated, interacting exemplary cylinder lock, but not as mounted on a mower deck or PTO switch of an exemplary existing ride-on mower.

FIGS. 11A through 11D illustrate various perspective and side views, representing in isolation the two main components 20 and 22 of FIGS. 8A through 8E and 9A through 9F joined together with an associated, interacting exemplary cylinder lock 12, to collectively comprise a presently disclosed security device generally 16, but not as mounted on a mower deck or PTO switch of an exemplary existing ride-on mower. Particularly as represented in FIG. 11A, a channel generally 64 is formed in component 22, for operative association with channel 60 of component 20, for passage therethrough of reduced diameter portion 62 below knob 14.

Figure 11B:
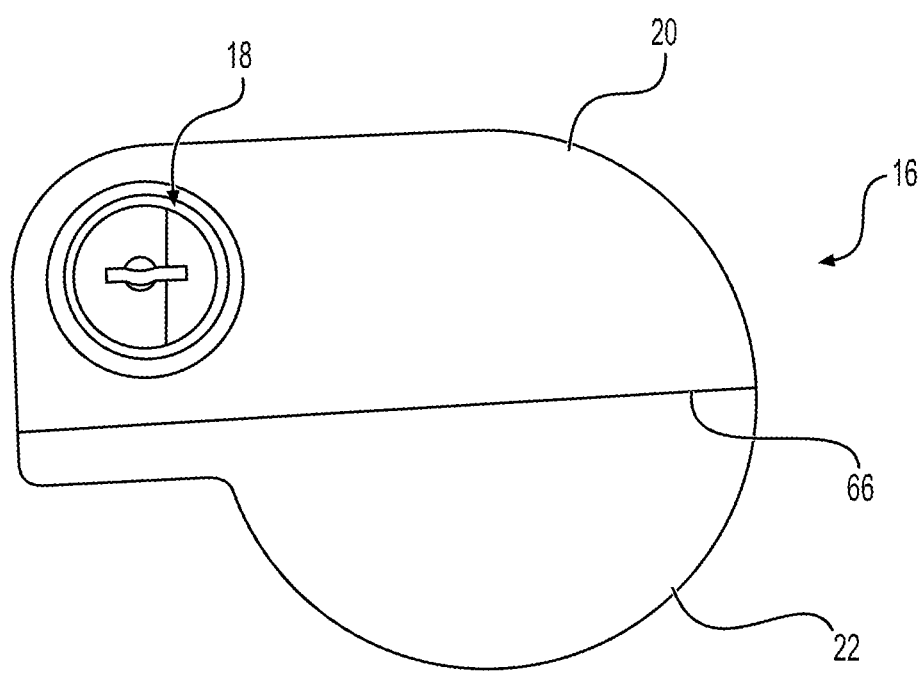
Figure 11C:
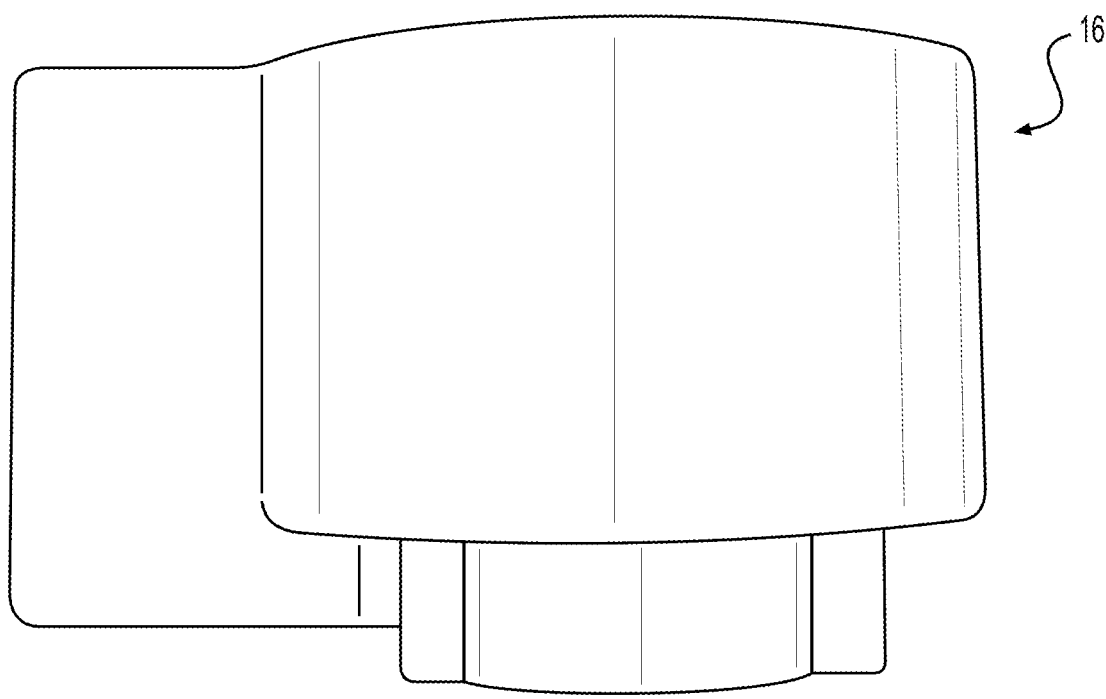
Figure 11D:
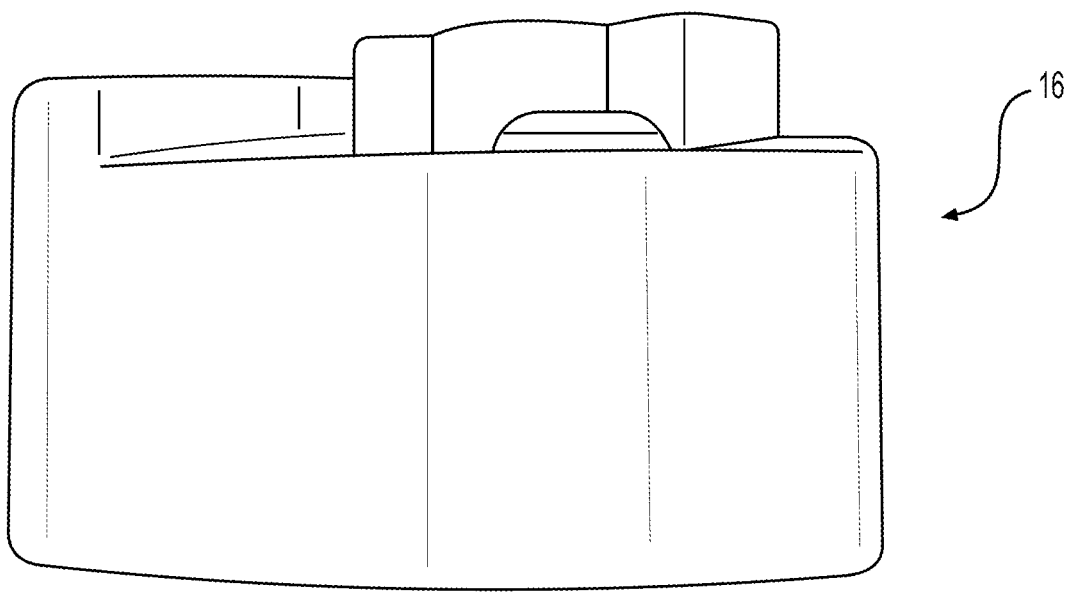

Otherwise, FIGS. 11A and 11B in particular illustrate various relatively smooth seams 66 formed by joined, mated components 20 and 22. In such way, presently disclosed security device 16 presents an object which is difficult to pry open or remove, whenever properly seated on a knob 14. Such security device may be formed of a variety of security materials, but generally relatively heavier-gauge metals are preferred. Such tough metal construction means that the security device 16 when properly applied disables the mower operation by locking out access to the PTO switch, which is otherwise forcibly placed into an engaged position, which prevents the mower engine from being cranked. Advantageously, the presently disclosed security device makes use of the mower's existing safety, interlock features, but without having to modify any portion of the mower. Furthermore, the mower once again operates completely normally once the security device is removed.

As will be understood from the complete disclosure herewith, once a selected cylinder lock 18 is seated into a component 20 and secured by a set screw 36 or similar element, the two components 20 and 22 may be seated around an associated PTO or mower deck switch knob 14 and mated together, with actuator 32 of the lock 18 secured into opening 46 of the loop 26 of component 22. With Through proper sizing of the components and their respective features, such combination causes knob 14 to be captured in its engaged position (knob pulled up or out), which otherwise forces the mower safety interlock to prevent mower engine operation. Such physical features may be simply reversed by using the lock key set 34 to withdraw the actuator 32 from the opening 46 of loop 26, so that components 20 and 22 may be separated. As desired, security device 16 may then be reapplied once the mower is finished being operated.

Those of ordinary skill in the art will understand from the complete disclosure herewith the various aspects of corresponding and/or associated methodology, both with providing and installing the presently disclosed subject matter, and with its use in practice.

Throughout, repeat use of the same reference numbers as in other figures is intended to represent similar or same features or steps, with pertinent discussion applicable thereto. Also, the exemplary illustrations are intended as representative only, and variations in such arrangements, and uses of different materials or sizes of particular elements, while maintaining an effective controlled security system, are intended to come with the spirit and scope of the present disclosure. The presently disclosed subject matter is also intended to encompass variations such as reversal of parts or mere changes as needed in sizes of components for various installations.

While the presently disclosed subject matter has been described in detail with respect to specific embodiments thereof, it will be appreciated that those skilled in the art, upon attaining an understanding of the foregoing, may readily produce alterations to, variations of, and/or equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A removable lawn mower PTO switch cover, comprising:
   a first component comprised of relatively heavier-gauge metals, forming an internal partial cavity and a protruding metal loop;
   a second component comprised of relatively heavier-gauge metals, forming an internal partial cavity and a separate internal opening for receiving said protruding metal loop completely inside said second component whenever said first and second components are joined, and forming a separate actuator lock opening;
   an extendable actuator lock receivable by said second component in said actuator lock opening so that actuation of said lock extendable actuator interacts with said protruding metal loop of said first component inside said second component internal opening for selectively joining said first and second components and their respective partial cavities together, with said partial cavities received about said lawn mower PTO switch; and an internal stop wall defined by said components for preventing said lawn mower PTO switch from being depressed whenever said components are received about said lawn mower PTO switch.

2. A removable lawn mower PTO switch cover as in claim 1, wherein said lock is key-actuated.

3. A removable lawn mower PTO switch cover as in claim 1, wherein said lock is a cylindrical lock secured into said second component by a set screw.

4. Methodology for preventing unauthorized cranking of a lawn mower having push/pull mower deck or power-takeoff (PTO) switch interlocking technology to prevent cranking of the mower while the blades are in an engaged drive position thereof, comprising:

providing two reinforced components having respective internal partial cavities which when combined form an interior chamber for receiving the knob of a mower PTO switch, blocking the ability to push in the knob; and selectively, securely joining the two components with the knob of the mower PTO switch received therein, and blocked from being pushed in to a disengaged drive position thereof; and wherein one of the components includes a protruding metal loop, and the other of the components includes a separate interior receptacle portion formed by the other component, for the protruding metal loop to be completely inserted into the other component, the other component further forms a separate actuator lock opening for receiving an extendable actuator lock so that actuation of said lock extendable actuator interacts with said protruding metal loop in the other component for selectively joining the two components together, and said two reinforced components form a stop wall adjacent said interior chamber for receiving the knob of a mower PTO switch, and blocking the ability to push in the knob, whereby the existing interlocking technology of the mower is used in order to prevent unauthorized cranking of the mower.

5. Methodology as in claim 4, wherein said protruding metal loop when inserted into the receptacle portion is selectively engaged by an extendable actuator of an associated cylinder lock in order to secure the two components together in place surrounding the knob of the mower PTO switch.

6. Methodology as in claim 5, wherein the mower comprises a ride-on style lawn mower.

7. Methodology as in claim 5, wherein the associated cylinder lock is key-operated.

8. Methodology as in claim 7, further including selectively securing the cylinder lock to one of the components using a set screw.

9. Methodology as in claim 4, wherein said reinforced components comprise relatively heavier-gauge metals.

* * * * *